United States Patent Office 3,111,995
Patented Nov. 26, 1963

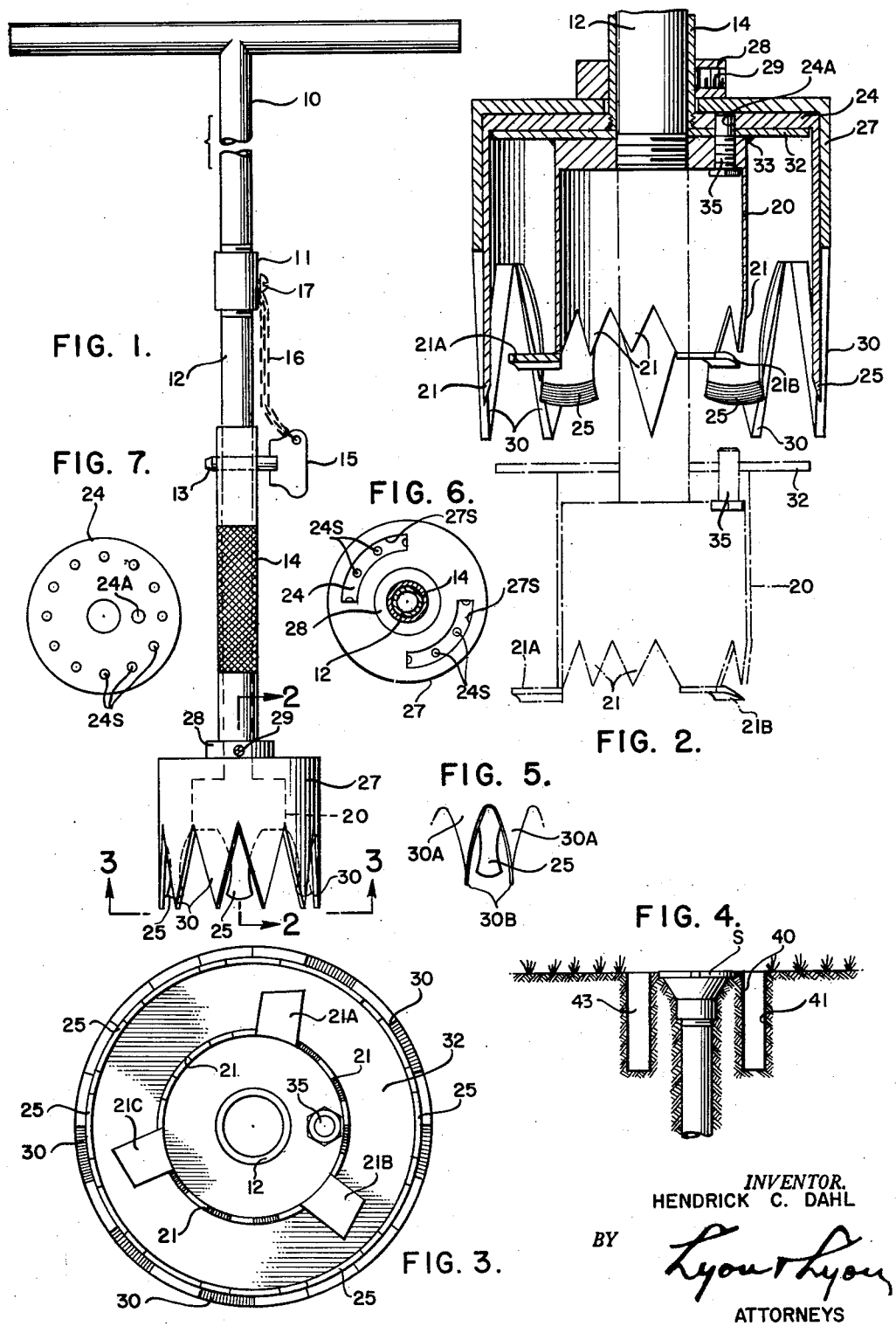

3,111,995
SPRINKLER HEAD TRIMMER
Hendrick C. Dahl, Beverly Hills, Calif. (% California Specialties Co., 2334 E. 8th St., Los Angeles 21, Calif.)
Filed Sept. 6, 1960, Ser. No. 54,265
7 Claims. (Cl. 172—18)

The present invention relates to a gardening tool and in particular one which is useful in trimming the grass around a sprinkler head.

Sprinkler head trimmers have previously been provided in which an attempt is made to clear the area surrounding a sprinkler head of grass and sod so that the same does not interfere with the intended purposes of the sprinkler head in production of a spray of water.

An object of the present invention is to provide an improved sprinkler head trimmer featured by its rugged construction, ease of operation and particularly one in which the cuttings both grass and sod may be conveniently removed from the trimmer.

Another object of the present invention is to provide a trimmer of this character constructed so that those parts which are likely to break may be conveniently replaced.

Another object of the present invention is to provide a trimmer of this character incorporating a novel cutting head construction.

Another object of the present invention is to provide a trimmer of this type involving two relatively movable cutters one of which is not only rotatable with respect to the other about a common axis but also one in which one of the cutters may be moved longitudinally along the common axis to eject cuttings and sod.

The features of the present invention which are believed to be novel are set forth with particularly in the appended claims. This invention itself, both as to its organization and manner of operation, together with further objects and advantages thereof, may be best understood by reference to the following description taken in connection with the accompanying drawings in which:

FIGURE 1 is a view in side elevation of a trimmer embodying features of the present invention.

FIGURE 2 is a sectional view taken substantially along the line 2—2 of FIGURE 1 and also illustrates in dotted lines the position to which the inner cutter may be moved for ejecting cuttings and sod.

FIGURE 3 is a view taken substantially along the line 3—3 of FIGURE 1.

FIGURE 4 illustrates the operation performed by the cutter or trimmer.

FIGURE 5 illustrates a modified construction.

FIGURES 6 and 7 show top plan views of elements in the construction shown in the previous figures modified to incorporate cleaning holes.

Referring to the drawings, the trimmer includes a T-shaped handle portion 10 of metal tubing or the like which is threadedly connected by means of a coupling 11 to the tubular portion 12 which has its lower end telescoped within the lower tubular portion 14. These two tubular portions 12 and 14 are normally prevented from sliding relative to each other by a pin 13 extending through aligned apertured portions of members 12 and 14, such pin 13 being conveniently mounted on a plate 15 and this securing member 13, 15 is conveniently maintained on the assembly by a chain 16 having one of its ends attached to the plate 15 and the other one of its ends secured to the coupling member 11 by means of screw 17.

This inner telescoping member 12 as shown in FIGURE 2 has its lower end threaded into an inner cutting member 20 which is in the form of an open ended cylinder having cutting teeth 21 formed along the peripheral edge of the open end of the cylinder member 20.

The outer telescoping member 14 as shown in FIGURE 2 has its lower end threaded into the cutting member 24 which is also in the form of an open ended cylindrical member having cutting teeth 25 formed along the peripheral edge of the open end of the cylinder member.

A third cutting member 27 also in the form of an open ended cylindrical member is retained between the cutting member 24 and a locking ring 28 secured by means of setscrew 29 on the outer telescoping member 14. This third cutting member 27 is also formed with cutting teeth 30 formed along the peripheral edge of the open end of the cylinder member 27.

Preferably the first-mentioned cutting member 20 has a circular plate 32 welded thereto as indicated at 33 so as to provide a relatively large extended bearing surface with the adjacent inner surface of the cutting element 24.

An indexing and logging pin 35 in the form of a bolt is threaded in the cutting member 20 and extends into a slightly enlarged apertured portion in the cutting member 24 to normally lock the cutting elements 20 and 24 together; but this connection between the cutting elements 20 and 24 provided by the pin 35 may be released for purposes described later.

Preferably the most inner cutting member 20, in addition to the cutting teeth 21, has formed on its cutting end the three laterally extending cutting elements 21A, 21B and 21C for the general purpose of feeding the cut grass and sod up into the annular space defined generally by the cutting elements 20 and 24.

It will also be observed that the most outer cutting elements 30 extend beyond the other cutting elements 25 and 21 and that these are preferably provided with sharp points so that they enter the ground when the tool having some weight is placed to encompass a sprinkling head S of the character shown in FIGURE 4.

In operation of the device the tool is placed to encompass the sprinkler head and the pointed cutting teeth 30 enter the ground either by the weight of the tool itself or by the operator applying downward pressure on the handle member 10. The operator then oscillates the handle 10 with the teeth 30 being engaged in the ground, in which case the two inner cutters 20 and 24 rotate as a unit being coupled together by the coupling pin 35. In general, the inner cutter 20 cuts the inner wall 40 in FIGURE 4 and the two cutting elements 24 and 27 acting as a shear cuts the other circular wall 41. The grass and sod originally between such walls 40 and 41 is fed up into the annular space between the cutting elements 20 and 24, aided by the winged cutting elements 21A, 21B and 21C which are pitched slightly to assure this action. After the annular groove 43 around the sprinkler head S has thus been cut the tool is withdrawn from the ground and the grass cuttings and sod between the cutting elements 20 and 24 are removed by the following procedure. The pin 13 is withdrawn from the aligned apertured portion in the telescoping members 12 and 14 and the operator grasps the knurled portion 14A on the telescoping member 14 with one hand and moves the other telescoping member 12 within the outer telescoping member 14 using his other hand to move the inner cutter member to its position indicated in FIGURE 2. As a result of this operation the pin 35 is released from the cutting element 24 and the plate 32 secured to the cutting element 20 serves to eject the cuttings from the tool. After this ejecting operation the inner telescoping member 12 is moved inwardly to again align the pin 35 within the apertured portion 24A of the cutting member 24 and the pin 15 is replaced in its position shown in FIGURE 1 so that the tool is again ready for the next trimming operation.

Preferably, the number of cutting teeth 30 and 25 are unequal in number so that the shearing action between the two may be accomplished gradually instead of all at one time. For this purpose the number of cutting teeth on the outer cutting member 27 may be 10 in number whereas the number of cutting teeth 25 on the inner cutting member 24 is six in number.

Preferably, the teeth 21 on the innermost cutting member 20 are V-shaped with the edges defining the V being sharpened.

While FIGURE 1 shows the cutting teeth 30 as also being generally V-shaped, preferably the same, as shown at 30A in FIGURE 5, are generally arcuate or generally parabolic in shape, terminating, however, at pointed ends 30B to facilitate their entrance into the ground. By thus making the outermost teeth parabolic in shape, the space between the outermost cutting elements is increased with the result that the adjacent arcuate sharpened cutting edges of the most outer cutting teeth produce a smoother shearing action. Also, as shown in the drawings, the cutting teeth 25, besides being generally arcuate, have an arcuate sharpened forward projecting cutting edge.

In the modified construction shown in FIGURES 6 and 7 the upper ends of the outer and inner members 27 and 24 respectively are apertured for purposes of cleaning the inside of the device as, for example, by a water stream produced by a garden hose. The apertured portions in the outer member 27 comprise two arcuate slots 27S and the apertured portions in member 24 comprise a series of bores 24S arranged on a circumference of a circle and aligned with the slotted portions 27S so that a water stream may pass, in turn, through the outer and inner members 27 and 24 to clean the internal portion of the tool.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A trimmer of the character described comprising a first cylindrical cutting element, a second cylindrical cutting element telescoped within the first cylindrical element, said first and second cutting elements having cooperating teeth for producing a shearing action therebetween, a third cylindrical cutting element within and spaced from said second cylindrical cutting element, said first and second and third cylindrical elements being coaxially arranged, means for rotating said second and third cutting elements as a unit within the first cutting element said means including a detachable connection between said second and third cutting elements, and means for moving said third cutting member in its axial direction relative to said second cutting element for releasing said detachable connection.

2. A trimmer of the character described comprising a pair of coaxial cooperating circular shearing cutters, an inner cutter coaxially arranged within said pair of cutters and spaced therefrom to provide an annular space between said inner cutter and the innermost one of said pair of cutters, means for rotating said one of said pair of cutters and said inner cutter as a unit with respect to the other of said pair of cutters, an ejector plate mounted on said inner cutter and extending between said inner cutter and said one of said pair of cutters, said ejector plate being located within said annular space and above the cutting edges of said circular shearing cutters and defining a wall of said annular space, and means for moving said inner cutter along its axis out of said pair of cutters to cause said ejector plate to eject debris within said annular space.

3. A trimmer as set forth in claim 2 in which said pair of cutters each having cutting elements thereon with the number of cutting elements on one of the same being unequal to the number of cutting elements on the other of the same.

4. A trimmer as set forth in claim 2 in which the outermost one of said pair of cutting elements has a plurality of cutting teeth terminating in pointed edges that extend most outwardly of the trimmer.

5. A trimmer as set forth in claim 2 in which said pair of cutters have cooperating teeth defining generally an area between the same.

6. A trimmer as set forth in claim 2 in which said pair of shearing cutters have abutting flat end sections, said end sections having aligned apertured portions therein through which a water stream may pass for cleaning purposes.

7. A trimmer of the character described comprising a handle defined by two telescoping members, releasable means normally securing said telescoping members together, a first circular cutting element affixed to one of said telescoping members and having coaxially arranged therewith a pair of cooperating shearing circular cutting elements coaxially arranged with the first cutting element and spaced therefrom, connectable means defining a detachable connection between said first cutting element and one of said pair of cutting elements, means mounting the other of said pair of cutting elements on said other telescoping member, said one of said pair of cutting elements being connected to said other telescoping member, said connectable means defining a detachable connection coupling said first cutting element and said one of said pair of cutting elements together as a unit to permit rotational movement of the same as a unit when said handle is turned, said releasable means when released allowing said telescoping members to move relative to one another to disestablish said detachable connection to permit said first cutting element to move axially with respect to said pair of cutting elements.

References Cited in the file of this patent

UNITED STATES PATENTS

| | | |
|---|---|---|
| 39,560 | Fitts et al. | Aug. 18, 1863 |
| 341,646 | Fouts | May 11, 1886 |
| 1,722,450 | Barry | July 30, 1929 |
| 1,866,073 | Aberle | July 5, 1932 |
| 2,733,100 | Simonsen | Jan. 31, 1956 |
| 2,821,019 | Immink | Jan. 28, 1958 |
| 2,953,852 | Dehn | Sept. 27, 1960 |